(12) United States Patent
Kirschner

(10) Patent No.: US 6,202,594 B1
(45) Date of Patent: *Mar. 20, 2001

(54) DEVICE AND METHOD FOR WATERING A PET

(76) Inventor: Jonathan Kirschner, 5224 Old Mountain La., Powder Springs, GA (US) 30127

( * ) Notice: Subject to any disclaimer, the term of this patent is extended or adjusted under 35 U.S.C. 154(b) by 0 days.

This patent is subject to a terminal disclaimer.

(21) Appl. No.: 09/146,543

(22) Filed: Sep. 3, 1998

Related U.S. Application Data

(63) Continuation-in-part of application No. 08/933,180, filed on Sep. 18, 1997, now Pat. No. 5,934,221.

(51) Int. Cl.$^7$ .................................................. A01K 7/00
(52) U.S. Cl. .................................................. 119/72
(58) Field of Search ........................ 119/69.5, 72, 666, 119/667, 718

(56) References Cited

U.S. PATENT DOCUMENTS

| | | | |
|---|---|---|---|
| 4,987,861 | * 1/1991 | Lemire et al. | 119/667 |
| 5,063,880 | * 11/1991 | Bouthillier | 119/667 |
| 5,630,379 | * 5/1997 | Gerk et al. | 119/667 |
| 5,934,221 | * 8/1999 | Kirschner | 119/72 |

* cited by examiner

Primary Examiner—Robert P. Swiatek
(74) Attorney, Agent, or Firm—James L. Sherman

(57) ABSTRACT

A pet watering device for automatically providing water to a pet, such as a dog, from a source of water under pressure. The pet watering device includes a water supply conduit having a first end which is operably connected to a faucet and a second end which is disposed remote from the faucet to allow a discharge of the water therefrom. A valve is in the water supply conduit for being opened to allow the water to flow through the water supply conduit and closed to prevent the flow of the water therethrough. The water supply conduit includes a mounting element for mounting the second end at a selected position for allowing the pet to drink the water therefrom. A sensor is for sensing the presence of the pet near the second end of the water supply conduit. The sensor is operably connected to the valve to cause the valve to be opened after the pet is sensed moving near the second end and to be closed after the pet is no longer being sensed near the second end. The water supply conduit and the second end thereof are configured to facilitate the flow of water therethrough at a flow rate which will allow the pet to drink the water without being frightened thereby.

32 Claims, 5 Drawing Sheets

DEVICE AND METHOD FOR WATERING A PET

This application is a continuation-in-part of Application Ser. No. 08/933,180, filed on Sep. 18, 1997, now U.S. Pat. No. 5,934,221.

BACKGROUND OF THE INVENTION

1. Field of the Invention

This invention relates to a device for watering a pet, such as a dog, and, more specifically, to such a device which utilizes a source of water under pressure to direct water in a general outward direction at a convenient height for allowing access thereto by the pet when the pet is sensed in the general outward direction from the device.

2. Brief Description of the Prior Art

While there is a need for providing water to pets, such as dogs, it is not uncommon for owners to simply provide a water dish or the like from which the pet is able to drink water as desired. The owner typically tries to maintain a sufficient quantity of water in the bowl for the pet over an extended period of time. However, the water in such bowls can become contaminated and not truly fit for drinking by the pet. In any case, it is also not uncommon for the owner to sometimes fail to provide the water needed and thus cause the pet to be deprived of the desired amount of water. Additionally, if the owner has a number of pets having access to the bowl or bowls, such problems would be compounded. The failure to provide a sufficient quantity of water over an extended amount of time would be more significant if the pet or pets are being kept outside of the house where the temperature and conditions would be more critical if water is not available.

While some pet stores offer feeding dishes that include complicated means for metering out controlled amounts of food for pets over an extended period of time, the automatic supply of water has been a different matter and continues to be of concern. For pets which primarily remain within a house, the owner is at least periodically able to observe the water dish and much more likely to determine if more water is needed in the dish. However, with some pets, such as larger dogs, it is not uncommon for them to be kept outside of the house and thus outside of the frequent observation of the owner. When a water dish is used for pets that are kept outside of the house, the owner may not be in a position to frequently or accurately monitor the amount of water in the dish.

U.S. Pat. No. 4,986,221 disclosed a livestock waterer which is relatively complicated and expensive to provide. The device includes a bowl that must be mounted in a fixed location to provide a bottom drain system. The drain area includes a water supply line and has a drain valve which is capable of being automatically closed to collect the water and opened to release the water from the bow. While the draining of the water would tend to prevent the contamination of the water, as discussed above, it is apparent that the device would by necessity be relatively complicated. The device includes one embodiment that employs an infrared sensor and an infrared detector to sense an object therebetween at the bowl and another embodiment employs a passive infrared detector to sense the presence of an animated body at the bowl. The device is intended to automatically supply water to the bowl when in use and to cause the water to drain from the bowl when not in use. While such a device to provide water to livestock at a outside location could be used for pets, the expense and difficulty of providing such a device tends to make its use for pets highly unlikely.

Accordingly, there remains a need for conveniently and reliably providing water to pets, preferably at an outside location, where the need for water by the pets might be greater and more difficult to provide and monitor by owners.

On the other hand, as seen in U.S. Pat. No. 5,009,192, an animal deterrent apparatus is intended to be installed in a field, yard or garden to selectively activate a pulse type sprinkler connected to a garden hose or the like to produce noise and direct a jet spray of water toward a selected area. The objective is to detect the presence of an animal by an infrared sensor physically separated from the sprinkler but directed toward the area to frighten the animal away. The apparatus can include a plurality of such sensors and sprinklers and is expected to cover an area extending approximately 50 feet. When the presence of an animal is detected in the area by one of the sensors, the sprinklers are turned on by providing power to open a solenoid valve which remains activated until the animal leaves the area and, perhaps, for a few additional seconds by the use of a time delay feature.

There are presently available numerous devices for automatically supplying water to people for washing hands at a sinks, such as those disclosed in U.S. Pat. No. 4,839,039 (and Reexamination Certificate No. B1 4,839,039 related thereto); U.S. Pat. Nos. 4,872,485; 4,941,219; 5,074,520; and 5,074,520. In fact, U.S. Pat. No. 4,872,485 even includes an embodiment which is configured to turn on the water of a water fountain when the presence of a person is sensed at the fountain. Nevertheless, while these devices appear to work for the particular purpose as intended, it is clear that they are relatively complicated and expensive to provide and not configured to simple provide water to pets in a convenient or reliable manner and would therefore not be appropriate for such use.

SUMMARY OF THE INVENTION

It is an object of the present invention to provide a pet watering device for automatically providing water to a pet, such as a dog, from a source of water under pressure.

It is another object to provide such a pet watering device which is capable of sensing the presence of the pet to automatically supply the water when the pet moves near to the device.

It is still another object to provide such a pet watering device which can be conveniently mounted on the ground and is configured to direct the water in a general outward direction at a convenient height to allow easy access thereto by the pet.

It is a further object to provide such a pet watering device with a configuration which will facilitate the flow of water therethrough at a flow rate to allow the pet to drink the water without being frightened thereby.

It is yet another object to provide such a pet watering device that can be easily installed at selected locations that are remote from the source of the water.

These and other objects of the invention are provided in a preferred embodiment thereof including a pet watering device for automatically providing water to a pet, such as a dog, from a source of water under pressure. The pet watering device includes a water supply conduit having a first end for being operably connected to the source of water and a second end for allowing a discharge of the water therefrom. A valve is in the water supply conduit for being opened to allow the water to flow though the water supply conduit and closed to prevent the flow of the water therethrough. The water supply conduit includes a mounting element for mounting the second end at a selected position for allowing the pet to drink the water therefrom. A sensor is for sensing the presence of the pet near the second end of the water supply conduit. The sensor is operably connected to the valve to be capable of causing the valve to be opened after the pet is sensed near the second end and to be closed after the pet is no longer sensed near the second end. The water supply conduit and the second end thereof are configured to facilitate the flow of water therethrough at a flow rate which will allow the pet to drink the water without being frightened thereby.

In the preferred pet watering device, the source of water includes a faucet and the pet watering device is for being used with a hose. The water supply conduit includes a major portion independent of the valve. The major portion includes the second end and an input hose connection opposite of the second end. The valve includes the first end and an output hose connection opposite the first end. The first end is connected to the faucet. The output hose connection and the input hose connection are capable of being joined by the hose to allow the second end to be located remote from the faucet.

In one configuration, the preferred pet watering device is for being installed on a lawn and the major portion includes the mounting element for mounting on the ground and for directing the water from the second end in a general outward direction from the major portion at a convenient height above the ground for allowing the pet access thereto. The sensor is mounted on the major portion to sense the presence of the pet near the major portion. A transmitter is mounted on the pet for transmitting an electronic signal capable of being sensed by the sensor to indicate the presence of the pet near the major portion. The sensor includes a signal transmitter and valve includes a signal receiver. The sensor is operably connected to the valve by the transmission of a presence signal from said signal transmitter to the signal receiver after the transmitter mounted on the pet is sensed near the major portion. At least one of the transmitter and the sensor includes adjustment features for only sensing the presence of the transmitter mounted on the pet within a predetermined range of the major portion. The sensor includes a sensor power source, the valve includes a valve power source independent of said sensor power source, the valve power source provides operating power to activate the valve, and the operating power is only utilized to cause the valve to open and to cause the valve to close.

In one embodiment, the valve includes valve control circuit having selective timing adjustment. The selective timing adjustment can include first adjustment for selective utilization of the operating power to cause the valve to open after a first predetermined time of continuous sensing of the electronic signal by the sensor. The selective timing adjustment can also include second adjustment for selective utilization of the operating power to cause the valve to close during a continuous sensing of the electronic signal by the sensor after a second predetermined period of time after the utilization of the operating power to cause the valve to open.

In another preferred pet watering device, the source of water includes a faucet and a hose which is capable of being connected from the faucet to the first end of the water supply conduit and the second end is located at the selected position remote from the faucet. The water supply conduit includes the mounting element for mounting in a fixed location relative to the ground and for directing the water from the second end in a general outward direction from the water supply conduit at a convenient height above the ground for allowing the pet access thereto. The device includes a transmitter mounted on the pet for transmitting an electronic signal capable of being sensed by sensor to indicate the presence of the pet near the second end. The valve is located between the first end and the second end and the sensor is mounted on the water supply conduit near the second end thereof to sense the presence of the pet located near the second end of the water supply conduit. At least one of the transmitter and the sensor includes an adjustment for only sensing the presence of the pet within a predetermined range of the second end.

In still another form of the preferred pet watering device, the valve includes a valve power source for providing operating power to activate the valve and the operating power is only utilized to cause the valve to open and to cause the valve to close. The valve includes a valve control circuit including selective timing adjustment feature. The selective timing adjustment feature includes a first adjustment for selective utilization of the operating power to cause the valve to open after a first predetermined time of continuous sensing of the presence of the pet near the second end. The selective timing adjustment feature includes a second adjustment for selective utilization of the operating power to cause the valve to close during a continuous sensing of the presence of the pet near the second end after a second predetermined period of time after the utilization of the operating power to cause the valve to open.

In another embodiment of the invention, a pet watering device is for automatically providing water to a pet, such as a dog, from a source of water under pressure. The pet watering device includes a water supply conduit having a first end for being operably connected to the source of water and a second end for allowing a discharge of the water therefrom. A valve is in said water supply conduit for being opened to allow the water to flow though the water supply conduit and closed to prevent the flow of the water. The water supply conduit includes a mounting feature for mounting the second end at a selected position for allowing the pet to drink the water. A transmitter is mounted on the pet for transmitting an electronic signal. A sensor is for sensing the electronic signal to indicate the presence of the pet near the second end. The sensor is operably connected to the valve to be capable of causing the valve to be opened after the transmitter is sensed near the second end and to be closed after the transmitter is no longer sensed near the second end. The valve includes a valve power source for providing operating power to activate the valve and is only being utilized to cause the valve to open and to cause the valve to close. The water supply conduit and the second end thereof are configured to facilitate the flow of water therethrough at a flow rate which will allow the pet with the transmitter thereon to drink the water without being frightened thereby. Additionally, the valve can include a valve control circuit including a selective timing adjustment feature. The selective timing adjustment feature includes a first adjustment for selective utilization of the operating power to cause the valve to open after a first predetermined time of continuous sensing of the electronic signal by the sensor and a second adjustment for selective utilization of the operating power to cause the valve to close during a continuous sensing of the electronic signal by the sensor after a second predetermined period of time after the utilization of the operating power to cause the valve to open.

The invention also includes a method of automatically providing water to a pet, such as a dog, from a source of water under pressure. The preferred method includes the steps of:

providing a water supply conduit having a first end for receipt of the water from the source of water and a second end for allowing discharge of the water therefrom;

providing a valve in the water supply conduit between the first end and the second end for being selectively opened to allow the water to flow though the water supply conduit and closed to prevent the flow of the water therethrough;

mounting the second end at a fixed location and in a position for allowing the pet to drink the water therefrom;

sensing the presence of the pet near the second end of the water supply conduit;

opening the valve after the sensing of the presence of the pet near the second end;

closing the valve after there is no longer any such sensing of the presence of the pet near the second end; and causing the flow of the water through the second end to be at a controlled flow rate which will allow the pet to drink the water without being frightened thereby after the opening of the valve.

An additional step would include at least periodically causing a limited flow of the water through the water supply conduit independent of the sensing of the presence of the pet near the second end with the limited flow tending to prevent any freezing of the water in the water supply conduit at low operating temperatures.

In the preferred method, the step of mounting includes locating the second end above the ground and the step of causing the flow of water includes directing the water from the second end in a general outward direction from the water supply conduit at a convenient height above the ground for allowing the pet access thereto. The step of sensing is provided by mounting a transmitter on the pet for transmitting an electronic signal and mounting a sensor on the water supply conduit adjacent the second end thereof which is capable of sensing the electronic signal for indicating the presence of the pet with the transmitter thereon near the second end of the water supply conduit.

Where the source of water includes a faucet, the step of providing the water supply conduit can include providing a major portion physically separated from the valve with the second end on the major portion and the first end on the valve. The method would further include steps of securing the first end to the faucet and installing a hose between the valve and the major portion of the water supply conduit. The step of sensing includes transmitting a presence signal from the sensor adjacent the second end and receiving the presence signal at the valve for the opening and the closing of the valve.

In one form of the preferred method, the source of water includes a faucet and a hose and the step of providing the water supply conduit includes connecting the hose between the faucet and the first end.

In the preferred method, the step of sensing only occurs when the pet is located within a range of about five feet from the second end.

The method can further include the steps of providing operating power to activate the valve and only utilizing the operating power for the opening of the valve and for the closing of the valve.

The method can further include the step of selectively delaying the opening of the valve for a first predetermined time after the sensing of the presence of the pet and/or the step of selectively initiating the closing of the valve after a second predetermined time after the opening of the valve during the sensing of the presence of the pet.

DETAILED DESCRIPTION OF THE PREFERRED EMBODIMENTS

Figure 1:
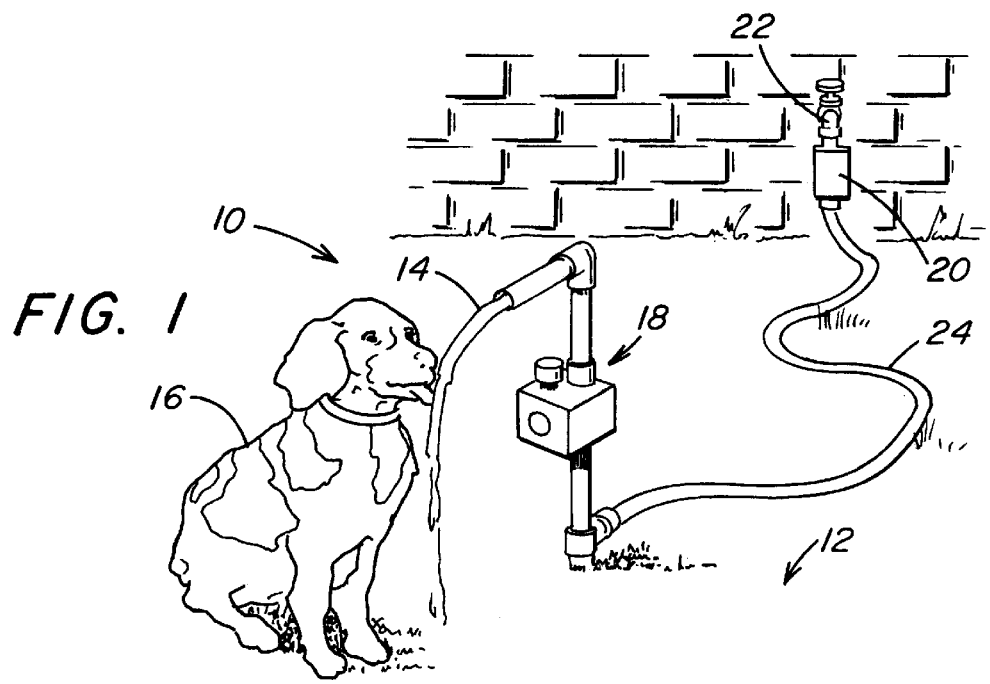
FIG. 1 is a view of the preferred pet watering device including various features of the invention as it would be installed in a lawn.
Figure 2:
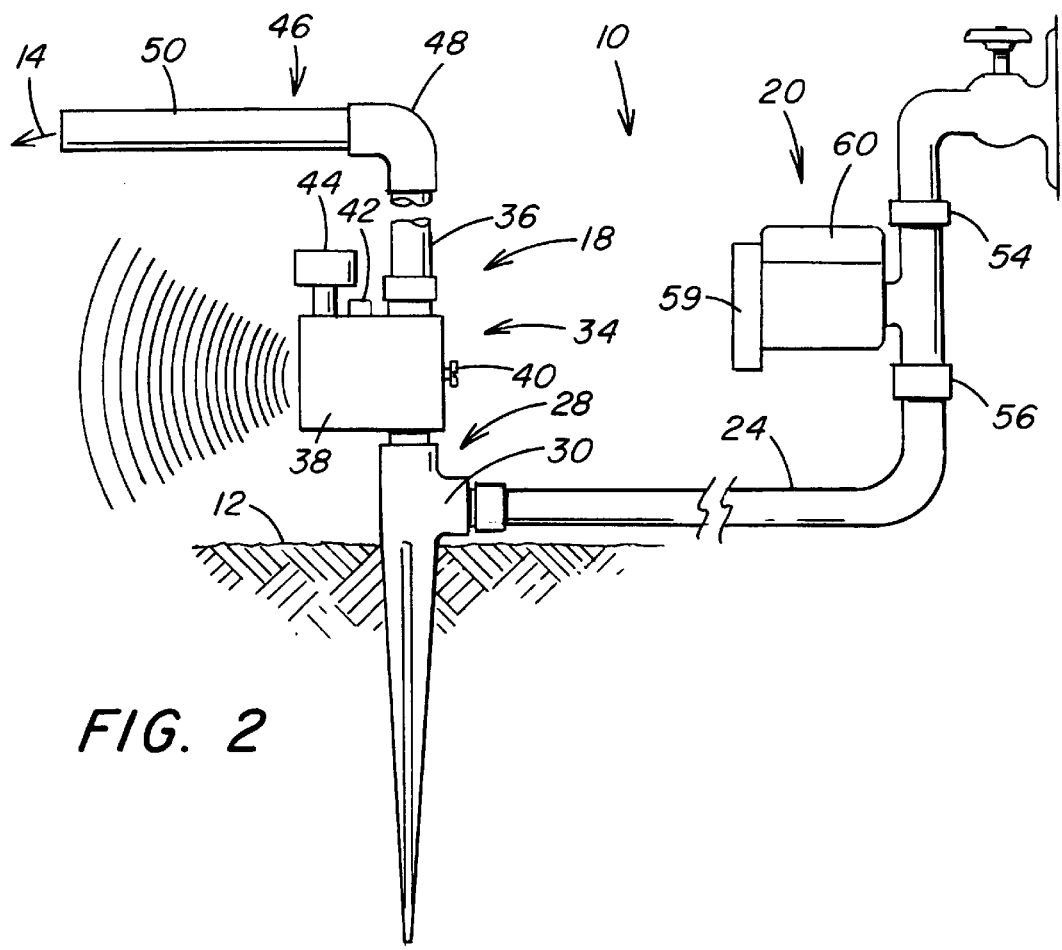
FIG. 2 is an elevational view of the preferred device of FIG. 1 with the valve thereof in the opened position.
Figure 3:
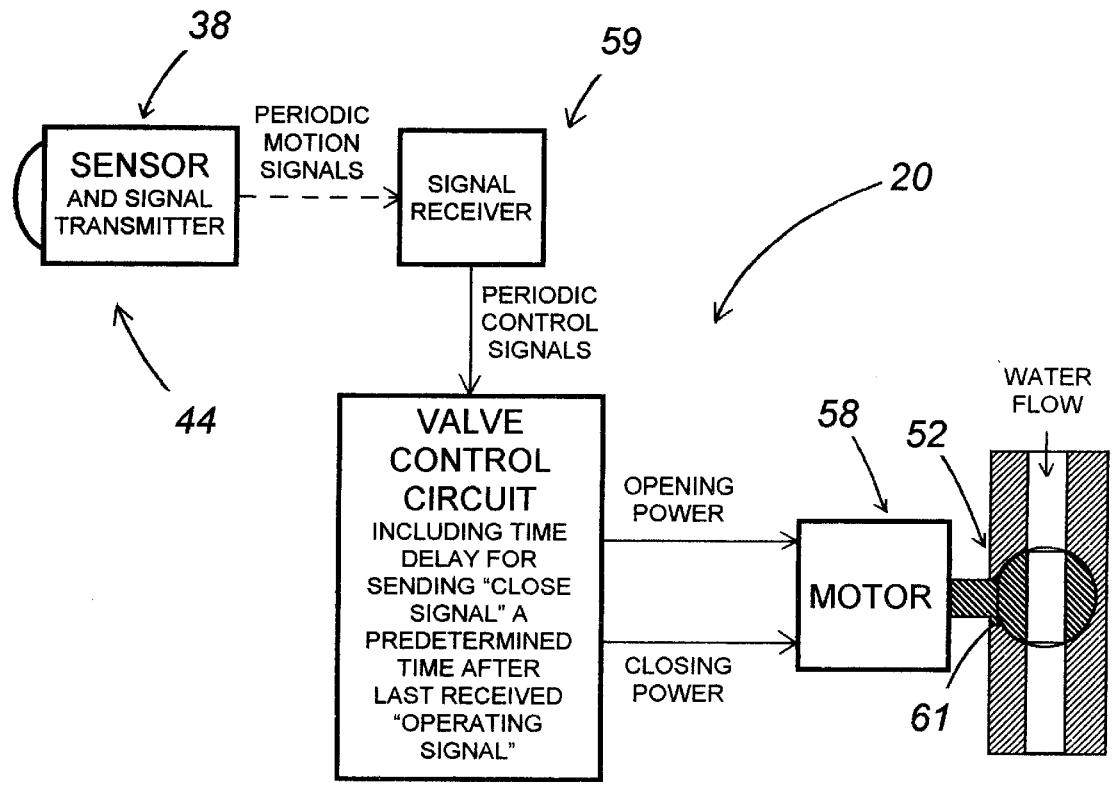
FIG. 3 is a schematic diagram demonstrating the operation of the valve control circuitry for controlling the valve of the preferred device of FIG. 1.

As seen in FIGS. 1, 2 and 3, the preferred pet watering device 10 is installed on a lawn, yard or ground 12 for automatically providing water 14 for a pet, such as a dog 16, from a source of water under pressure. The preferred pet watering device 10 basically includes water conduit element that is primarily formed of two parts, a major outlet portion 18 and a valve portion 20. The valve portion 20 is configured to be installed on an outside faucet 22, the preferred source of water under pressure. A conventional hose 24 is used to connect the valve portion 20 to the major outlet portion 18 to allow the major outlet portion 18 to be installed at any convenient location on the lawn or ground 12. As will be seen, when the major outlet portion 18 is properly install on the lawn 12 at a desired location, the pet 16 will be able to approach to within about five feet of the major outlet portion 18 to automatically activate the device 10 to cause water 14 to flow therefrom in a manner that allows the pet 16 to drink the water 14. The water 14 from the device 10 will preferable flow at a maximum rate of less than about three gallons per minute and with a velocity which will not produce any loud noises to frighten the pet 16 but will allow the pet 16 to drink directly therefrom as it is flows generally outwardly to the ground 12.

The major outlet portion 18 includes a base 28 that has an inlet connection 30 for the hose 24 and a spike 32 for being securely mounted in the ground 12. The central region 34 includes a portion of the conduit the extends vertically above to the ground 12 and may include means for altering the height thereof above the ground 12. For example, with the preferred device 10, alternative pipe sections 36 of different lengths or a single pipe section 36 which could be cut to a desired length can be provided for installation by the owner to provide the desired height above the ground for the particular pet intended to use the device 10.

The central region 34 also includes a sensor means 38 which preferably senses the movement of the pet within a maximum range of about five feet. The preferred sensor means 38 includes physical adjusting means 40 for adjusting the location and direction of the sensor means 38 on the central region 34 of the major outlet portion 18. Additionally, the preferred sensor means 38 is an infrared detector of the reflector type which is well known in the sensing art and may also include electronic adjusting means for adjusting the sensitivity thereof in order to insure that the pet 16 is only sensed when moving relatively close to the major outlet portion 18 and not when it is simply walking thereby at some remote distance. Although conventional batteries could be used as the power source, the preferred sensor means 38 is powered by a solar battery 42 and is further adapted to transmit a motion signal through a signal transmitter 44 each time the movement of the pet 16 is detected. The use of the motion signal for causing the opening and the closing of the valve in the valve portion 20 will be discussed hereinbelow.

As will be seen, providing the preferred sensor means 38 with the solar battery 42 and with the signal transmitter 44 allows the major outlet portion 34 to be easily and conveniently separated from the valve portion 20 and the faucet 22. Although a "line-of-sight" must be maintained between the signal transmitter 44 on the major outlet portion 34 and the valve portion 20 of the preferred device 10, the general limit on the distance therebetween would be the length of the connecting hose 24.

The major outlet portion 18 most significantly includes an upper region 46 having an elbow 48 connected to the pipe 36 for supporting a second end 50 of the major outlet portion 18. The second end 50 extends horizontally in a direction generally outwardly of the central region 34. When the device 10 is activated, water 14 will flow from the second end 50 at a flow rate which will allow the pet to drink therefrom but without creating sufficient spraying or noise that would tend to scare the pet 16.

As best seen in FIG. 3, to actually control the flow of water through the device 10, the valve portion 20 preferably includes a rotatable ball valve 52 which is to be opened when the pet is moving near the second end 50 and to be closed after the pet is no longer near the second end 50. The valve portion 20 includes a first end 54 for being directly connected to the outlet of the faucet 22 and an outlet end 56 to which one end of the hose 24 is connected. The valve portion 20 includes a valve operator which, in the preferred device 10, is a motor 58 which will cause rotation of the ball valve 52 and associated control circuitry of the type which is well known in the valve control art. While numerous types of solenoid operated valves might be used, the preferred valve is the rotating ball valve 52 that can be rotated in one direction into alignment by the motor 58 to allow the water to flow therethrough. To close the valve 52, the motor 58 is rotated in the other direction to block the flow of the water. The rotating ball valve 52 is preferred because it allows the valve control circuit to be configured to only require operating power when the valve 52 is being specifically opened and when the valve 52 is being specifically closed.

In order to cause the valve 52 to open and close in response to the movement of the pet 16 near the second end 50 of the major portion 18, the valve portion 20 includes a signal receiver 59 for receiving an initial motion signal from the transmitter 44 as soon as the pet is sensed to be moving within the range of the sensor means 38. The signal receiver 59 is operably connected to the valve control circuit and provides a control signal thereto whenever any motion signal is received from the transmitter 44. The valve control circuit includes the operating power for both the signal receiver 58 and the motor 58 from a battery 60 which is expect to simply include one conventional nine volt battery.

The sensor means 38 will detect any motion from a pet and cause a motion signal to be transmitted each time any motion is detected. When the motion signal is first received by the signal receiver 59, the valve control circuit will provide opening power to the motor 58 for a required amount of time to rotate the ball valve 52 from the closed position (not shown) through ninety degrees to open the valve 52 for the flow of water therethrough as shown in FIG. 3. After the required time, the opening power for the motor 58 is discontinued so that the valve 52 will physically be at the opened position. A mechanical stop 61 is also provided in the valve 52 to insure that the opened position is accurately obtained. As will be seen, once the valve 52 is opened, it will remain opened without any power being provided thereto until the valve control circuit causes the valve 52 to be closed.

The signal receiver 59 will continue to receive motion signals from the transmitter 44 as long as there is any movement of the pet 16 being sensed and will proved a corresponding control signals to the valve control circuit. However, when the valve control circuit receives additional control signals, it does not continue to power the motor 58 or needlessly reduce the power in the battery after it has been opened.

After the valve 52 has been opened, the valve control circuit utilizes a time delay means that is started each time there is a discontinuation of the control signals. The time delay means remains active as long as there are no new control signals but will begin each time that any newly received control signal is discontinued. If, after the time delay means has been activated, no new control signal is received for a predetermined amount of time, the valve control circuit will prove the closing power to the motor 58 for the required time to cause the valve 52 to rotate in the opposite direction to stop the flow of the water therethrough. The mechanical stop 61 again insures that the closed position is accurately obtained. Once closed, no more power is provided to the motor 58 and the valve 52 remains closed until a new movement of the pet is sensed by the sensor means 38 and the valve 52 is opened to repeat the entire process.

In operation, when a pet moves within the range of the sensor means 38, the valve 52 will open and water will flow from the second end 50 for the pet to drink therefrom. It has been found that when the pet is drinking the water it is not uncommon for the pet to remain relatively still so that the sensor means 38 no longer senses any movement. Without the time delay means, the valve 52 would be closed and the water would stop flowing. However, in the preferred device 10, the water will continue to flow for the predetermined amount of time to allow the pet to continue to drink. Admittedly, after the predetermined amount of time the pet may still be at the second end 50 and in a position to drink, but the valve 52 will be closed and the pet will not then be able to continue drinking the water. However, any movement by the pet, such as, for example, simply moving away from the second end 50, will cause the valve 52 to be opened to cause the water to begin flowing again. After the pet 16 leaves the range of the sensor 38, the valve 52 will be closed after the predetermined amount of time and the water will stop flowing. The predetermined amount of time for the time delay means is preferably between ten to twenty seconds and about fifteen seconds has resulted in satisfactory operation of the device 10.

It has been found that various pets soon learn that the water might on occasion stop flowing but that it will begin to flow again once there is some new movement by the pet. Although the discussion above is generally directed to a use of the device 10 for one pet, it would be possible for several pets to attempt to use the device 10 at about the same time. The device 10 would operate to open the valve 52 whenever the sensor means 38 senses any movement of one or more pets within the range of the of the sensor means 38 and to attempt to close the valve 52 after no movement is being sensed. The presence of additional pets might increase the "activity" of the sensor means 38 but, because of the time delay means, there would not be any undue opening or closing of the valve 52 which would needlessly increase the power required for the operation of the device 10. In any case, the preferred valve portion 20 is configured to save power and thus the life of the battery by only requiring operating power for the activation of the motor 58 to open the valve 52 and for the activation of the motor 58 to close the valve 52. It will be apparent to those skilled in the valve control art that there are many valve configurations that employ solenoids that require operating power throughout the time the valve is opened and that such valve configurations would require a greater amount of power to operate the valve and would thus significantly reduce the life of the battery.

The preferred pet watering device 10 is particularly configured to provide a number of desired features intended to improve its overall operation. For example, the device 10 includes the physically separated valve portion 20 and major outlet portion 18 in order to prevent the hose 24 from being continuously operated under water pressure. It is not uncommon for hoses and/or the end fittings thereof to develop leaks when maintained under pressure over an extended period of time. With normal use, hoses tend to last a number of years. However, it has been found that hoses maintained under pressure for days and days cause stress that will cause the hose to fail prematurely. If such a failure occurs when the owner was not present, the uncontrolled loss of water could create serious problems. The preferred configuration would tend to eliminate any such possibility.

Still further, the ball of the valve 52 and other passages through the device 10 are generally sized to restrict the flow of the water therethrough to about three gallons per minute for a typical water pressure at the faucet 22. While the faucet 22 could be partially closed to further restrict the maximum flow of the water if a reduced rate is desired for a particular pet, the maximum flow rate of about three gallons per minute provided by the design of the valve 58 and passages would allow the faucet 22 to be completely opened in a manner well known in the valve art to prevent leaking around the stem when the faucet 22 is under full pressure.

Figure 6:
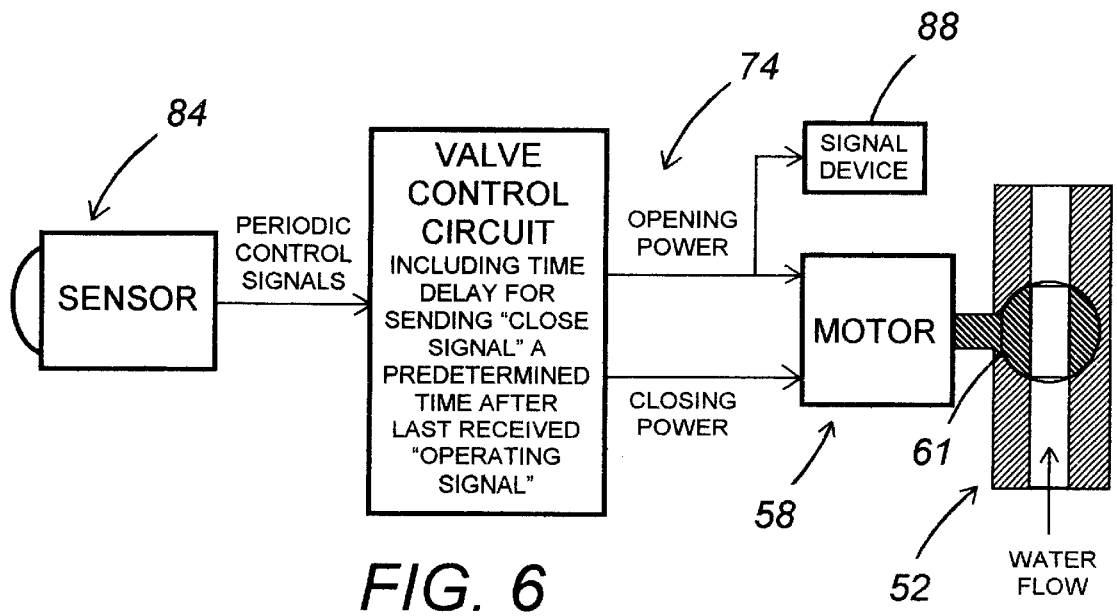
FIG. 6 is a schematic diagram demonstrating the operation of the valve control circuitry for controlling the valve of the preferred device of FIG. 4.
Figure 4:
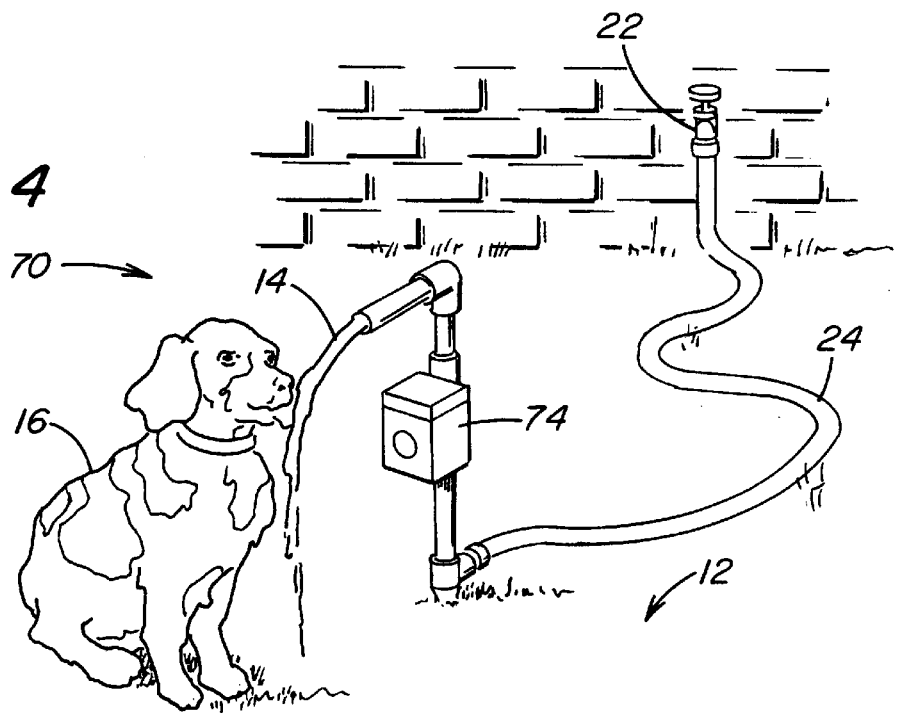
FIG. 4 is a view of another preferred pet watering device including various features of the invention as it would be installed in a lawn.
Figure 5:
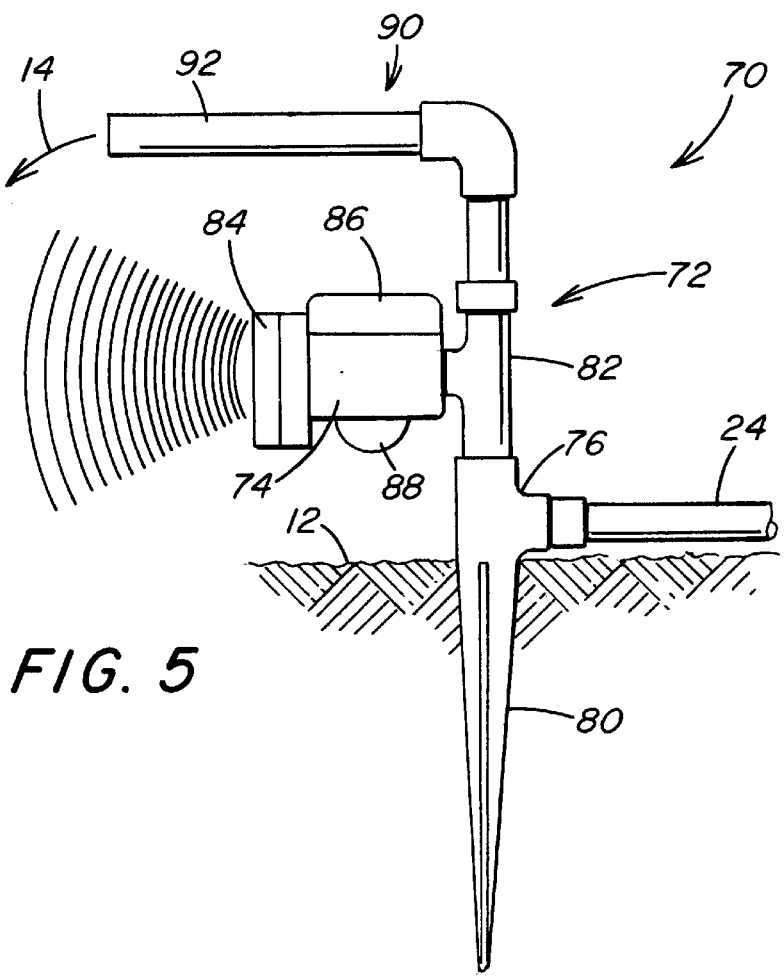
FIG. 5 is an elevational view of the preferred device of FIG. 4 with the valve thereof in the opened position.

As seen in FIGS. 4, 5 and 6, another preferred pet watering device 70, which is simpler and less expensive to provide than the device 10, does not include all of the features thereof and might be used in situations where the device 70 is only used under faucet pressure periodically and for limited amounts of time. However, the device 70 does include other features that might also be employed in the device 10. The device 70 has conduit means 72 which includes valve means 74 therein rather than being physically separated for direct installation on the faucet 22. Instead, the source of the water under pressure for the device 70 is the faucet 22 and an attached hose 24 which is connected to the first end 76 at the base 78 of the conduit means 72. A spike 80 is again employed to mount the device 70 on the ground 12. A central region 82 of the device 70 includes the valve means 74 which is again configured to be opened and closed as required for the control of the water therethrough. The upper region 90 of the device 70 again has a horizontally extending second end 92 from which the water 14 for the pet 16 will flow at the maximum rate of about three gallons per minute and at a velocity which would not tend to frighten the pet 16 by creating movement which is too rapid or noise that is too loud.

In the device 70, the sensor 84, generally configured like the sensor 38, is mounted directly on the body of the valve means 74. Accordingly, there is no need for a transmitter 44 or a separate source of power 42 for the sensor 84. Instead, the power for the sensor 84 and the valve control circuit of the valve means 74 would be a single nine volt battery 86. As best seen in FIG. 6, the valve means 74 again includes a valve control circuit, a motor 58, a ball valve 52 and a mechanical stop 61 like those of the valve portion 20. However, the device 70 has includes therein a signal device 88, such as small buzzer or bell, which is also activated by the valve control circuit as the opening power is being provided to the ball valve 52. The small buzzer or bell is intended to simply attract the attention of the pet 16 as the water 14 is being supplied at the second end 92. The periodic activation of the buzzer or bell might also provide an audible indication to the owner when and how often the device is being used by the pet or pets 16.

The other preferred pet watering device 70 will function in the same manner as the device 10. When a pet is first sensed moving near the second end 92, the valve control circuit will again cause the valve 52 to open to allow the water to be discharged from the second end 92 in a general outward direction from the device 70 to allow the pet to drink the water. Because of the time delay means, the valve 52 will again only be closed at the end of the predetermined amount of time after the last movement of the pet is sensed by the sensor 84. Consequently, the overall configuration of the device 70 will only require a minimum amount of power to open and close the valve 52 to significantly extend the life of the battery 86.

It is clear from the discussions of the preferred embodiments that any number of alterations could be provided thereto without departing from the scope of the invention as claimed. For example, while the batteries 60 and 86 are preferred, it would be possible to include another source of power, such as house power, that would work satisfactorily but would tend to complicate the installation of the devices. While the reflector type of infrared detector is preferred, it should be clear to those skilled in the sensing art that other sensors could be employed. For example, a beam type of infrared detector or an ultra-sonic detector could as be used to sense the movement or presence of the pet near the second, outlet end of the device.

In fact, if a particular installation of the device would appear to include a significant number of "false" signals, such as with the detection of birds, animals or people that are not intended to operate the device, a transmitter-receiver sensor configuration could be used. Such a sensor configuration would include the receiver thereof mounted on and associated with the device for only being activated (to open the valve and supply the water) by a transmitter which could be attached, for example, to the collar of the pet for which the water is intended.

Figure 7:
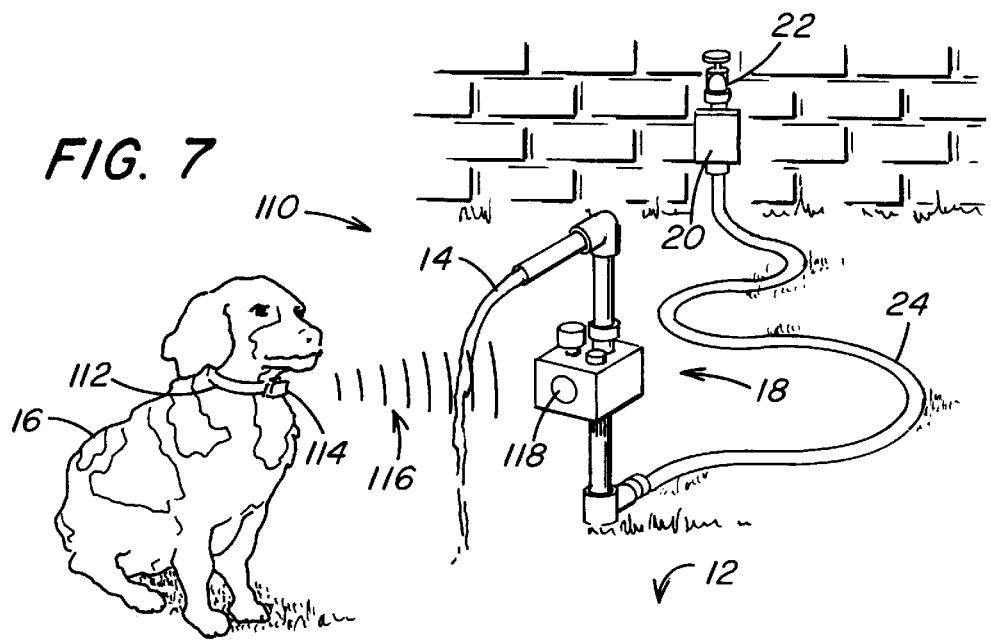
FIG. 7 is a view of still another preferred pet watering device including various features of the invention as it would be installed in a lawn.
Figure 8:
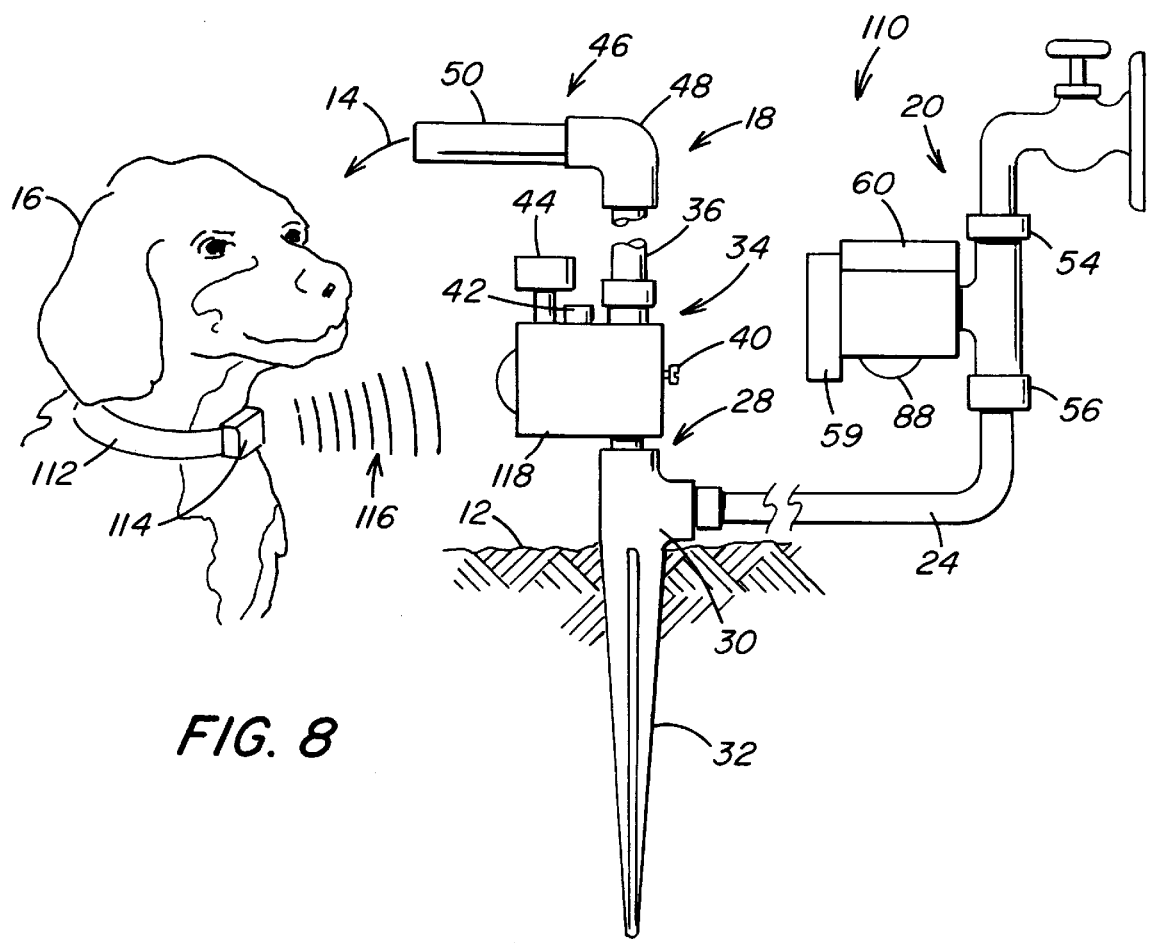
FIG. 8 is an elevational view of the preferred device of FIG. 7 with the valve thereof in the opened position.
Figure 9:
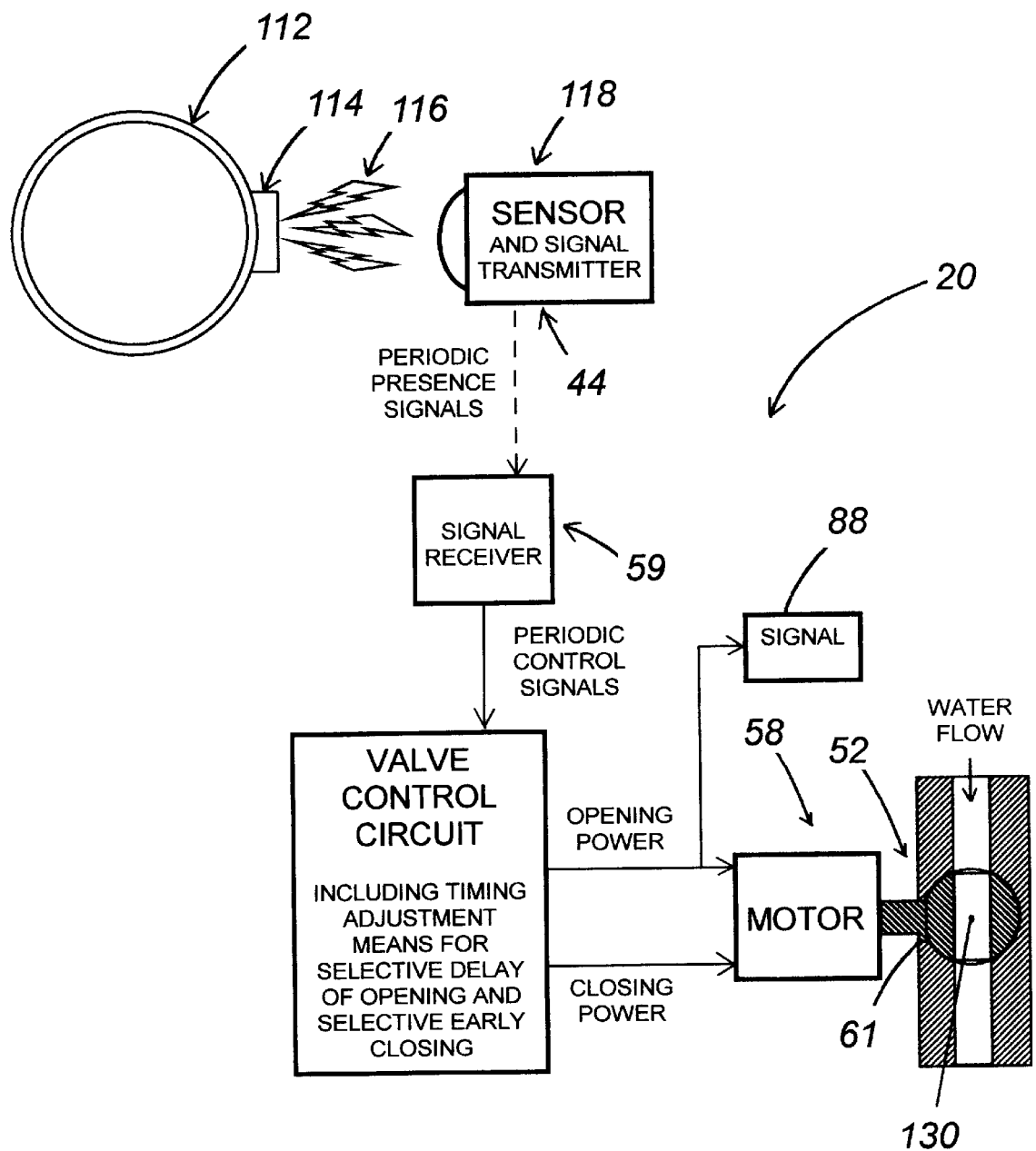
FIG. 9 is a schematic diagram demonstrating the operation of the valve control circuitry for controlling the valve of the preferred device of FIG. 7.

As seen in FIG. 7, 8 and 9, such a pet watering device 110 is similar to device 10 in that it incorporates a number of the elements and features thereof while including a number of additional elements and features that may be needed because of the particular operating conditions that would exist if a transmitter-receiver sensor configuration is employed. In the device 110, the pet 16 is provided a collar 112 that includes an electronic transmitter 114 that is capable of sending a low level electronic signal 116 that can be received and sensed by a sensor means 118 which is physically mounted on the central region 34 like the sensor means 38 of the device 10. The sensor means 118, like the sensor means 38 would again include a signal transmitter 44 to send a "presence signal" to the signal receiver 58 operably connected to the valve portion 20 for the general operation of the valve thereof in the same manner as the device 10. The electronic transmitter 114 on the collar 112 would require a battery but, since such a signal would require very little power for the generation thereof because of the short distances desired to be sensed, the battery would not be unduly depleted.

Generally, the overall system would include the continuous transmission of the low power signal from the transmitter 114 but would limit the ability of the sensor means 118 receiving the signal to only "sense" the transmitted signal when the transmitter 114, and thus the pet 16, is within a range of about five feet from the sensor means 118. It should be clear to those skilled in the electronic transmitter-receiver art that varying or adjusting in the signal strength from the transmitter 114 and/or the sensitivity of the receiver in the sensor means 118 can cause the device 110 to be configured so that the sensor means 118 will only effectively "sense" the collar 112, transmitter 114 and pet 16 when within a range of about five feet of the sensor means 118.

However, unlike the motion sensors of the devices 10 and 70, the sensor means 118 would be expected to continue the detect the presence of the collar 112, transmitter 114 and the pet 16 at any time they are within the designed range of about five feet. Accordingly, with the devices 10 and 70, were to disco were to discontinue to move, there would no longer be a control signal. Preferably, the time delay feature of the valve control circuits of the devices 10 and 70 would delay the sending of the "closing signal" to allow the pet to continue to drink for a predetermined amount of time even if there was no motion. However, with the sensor means 118, the presence of the transmitter 114 would still be detected as long as the collar 112 and pet 16 are within the designed range even if there is no movement. As a result, as best seen in FIG. 9, the valve control circuit of the device 110 would not be configured to have the particular timing feature of the devices 10 and 70, as discussed above, that delays the closing by only sending the "close signal" until some time after the last received "operating signal" because no movement of the pet is being sensed. Consequently, for the preferred basic operation of the device 110, the preferred valve control circuit of the device 110 would be capable of sending the opening signal to provide the opening power as soon as the collar 112, transmitter 114 and pet 16 are sensed within the designed range of about five feet of the sensor means 118. Still further, the valve control circuit of the device 110 would not be capable of sending any closing signal to provide the closing power until the collar 112, transmitter 114 and pet 16 are no longer being sensed by the sensor means 118. With such capabilities, the valve control circuit would basically be able to provide the opening power as soon as the transmitter 114 is sensed and to provide the closing power as soon as the sensing of the signal transmitted by the transmitter 114 discontinues when the pet 16 is outside the designed range.

However, despite the basic capabilities of the valve control circuit to open the valve when the transmitter 114 is initially sensed and then to close the valve when no longer being sensed, the preferred device 110 would include the valve control circuit thereof with selective timing adjustment means. The timing adjustment means could alternatively be employed to change or adjust the basic operation if desired or if it should prove to be necessary for effective operation because of the actions of some pets 16. A first adjustment of the timing adjustment means may be alternatively set to delay the opening power after the initial sensing in order to insure that the valve will not open as soon as the collar 112, transmitter 114 and pet 16 are sensed within the range. When activated, the first adjustment would delay the opening for a first predetermined period of time of continuous sensing of, for example, about five to ten second until the pet 16 is capable of getting closer to the end 50 and the water 14 before the valve would be opened. A second adjustment of the timing adjustment means may be alternatively set to positively generate the "closing signal", to proved the closing power to close the valve, even if the transmission of the transmitter 114 is still being sensed by the sensor means 118. When activated, the second adjustment would be capable generating the "closing signal" at the end of a second predetermined period of time of continuous sensing of about thirty to forty seconds, for example, after the "opening signal" had been generated to open the valve. The "closing signal" would be generated to provide closing power despite the continued sensing of the signal from the transmitter 114 by the sensor means 118.

With such a setting for the first adjustment of the timing adjustment means, the pet 16 might simply walk near the sensor means 118 for a few seconds and the valve would not be opened unless it remained within the range for the first predetermined delay time. Accordingly, the first adjustment would tend to prevent the supply of the water until the pet remained in the area. On the other hand, with such a setting for the second adjustment of the timing adjustment means, the valve would be closed at the end of the second predetermined time even if the pet 16 remained in the area after the pet 16 discontinues the drinking of the water. Admittedly, the valve might again open after the first predetermined delay time if the pet 16 stays in the area long enough but, at least, the flow of the water would be stopped for some period of time (after the second predetermined period of time) to "allow" the pet 16 to realize that the flow of water is stopped and to leave the area. It should be noted that the use of the timing adjustment means of the device 110 could, for some pets 16, result in the valve being repeatedly opened and closed because the pet 16 does not quickly leave the area. For such a situation, it might be better to increase the first predetermined period of time and to decrease the second predetermined period of time. Less water would be used and such settings would give the pet 16 a greater opportunity to leave the area while the valve is closed. While there might not be any settings that would only allow the valve to be opened when the pet 16 wants or needs water, the timing adjustment means would increase the likelihood that the valve could be used by the pet 16 to drink water but would not be needlessly left opened when water is not needed. The preferred device 110 again includes the signal device 88 activated by the opening power to provide positive indication to the pet 16 and the owner when the valve is being opened.

As seen in FIG. 9, the preferred device 110 includes an additional feature that might also be employed in the devices 10 or 70 if desired. Because the devices 110, 10 and 70 might be installed in regions where the temperature may go below freezing, it would be possible for the water in the piping to freeze and the valve to become inoperable if not used enough to cause sufficient and/or repeated flow which would tend to prevent the water from freezing. One means to provide sufficient flow which would tend to prevent freezing even if the valve is not opened by the actions of the pet 16 would be the inclusion of a small hole 130 in the ball of the valve which would allow a very small flow therethrough even when closed.

The small hole 130 simply demonstrates one means of preventing the freezing of the system by the intentional, limited flow of water therethrough at a time when the actions of the pet 16 has not caused the valve to be opened sufficiently to prevent the freezing. It should be clear to those skilled in the valve art that other means could be selectively used to at least periodically allow a limited the flow of water therethrough to prevent the water from freezing. For example, the valve might be constructed to allow movement of all or a portion of the valve seat to selectively allow the leaking of water therethrough only when the temperature is expected to be low enough for possible freezing. For another example, the valve control circuit of any of the devices 10, 70 or 110 might include a selectively activated time feature that will cycle the valve open and closed every few hours even if not opened by the actions of the pet 16. The activated time feature to cycle the valve could be manually selected by to owner or might be "selected" by a temperature sensing means incorporated in the valve control circuit so that the feature would be automatically "selected" when the temperature of the device falls below freezing. The opening of the valve by the valve control circuit for this purpose would not be for any extended amount of time and may not even require a full opening in order to produce sufficient flow to prevent the freezing. Clearly, those skilled in the art might include any number of means to at least periodically allow a limited flow therethrough independent of the actions of the pet 16 in order to prevent the freezing of the system and the valve. It should be clear to those skilled in the art from the combined teaching of the devices 10, 70 and 110 that there are various elements and features which have been included on one of the devices but which might be adapted for similar use in another of the devices. Further, the term "presence" used in some of the claims would more clearly apply to any configuration that employs a transmitter that is mounted on the pet to generate an electronic signal and is sufficiently close to the sensor means to enable the electronic signal to be received thereby. However, the term "presence" would also be applicable for other configurations when there is continuous movement of the pet within the range of the other types of sensor means which are primarily intended to directly sense such movement.

While it is clear that the preferred embodiments of the invention are particularly configured for installation in a lawn or yard for the discharge of the water on the ground, there is nothing to prevent the invention as claimed from being used in other manners while still falling within the scope of the invention as claimed. For example, there would be nothing to prevent the devices as taught herein from being altered to included a different mounting means which would allow them to be installed on a patio or in a garage area having a drain to allow the hose to be conveniently located in a shaded area so that the temperature of the water therein would not be significantly raised between uses. In fact, a similar such device could even be installed in a large walk-in shower within a house to enable automatic watering of a pet being kept within a house rather than only when the pet is located in lawn or yard of the house. It should be clear that any number of alterations could be made to the preferred embodiments without departing from the scope of the invention as claimed.

What is claimed is:

1. A pet watering device for automatically providing water to a pet, such as a dog, from a source of water under pressure, said pet watering device comprising:

water supply conduit means having a first end for being operably connected to the source of water and a second end for allowing a discharge of the water therefrom;

valve means in said water supply conduit means for being opened to allow the water to flow though said water supply conduit means and closed to prevent the flow of the water therethrough;

said water supply conduit means including mounting means for mounting said second end at a selected position for allowing the pet to drink the water therefrom;

sensing means for sensing the presence of the pet near said second end of said water supply conduit means;

said sensing means being operably connected to said valve means to be capable of causing said valve means to be opened after the pet is sensed near said second end and to be closed after the pet is no longer sensed near said second end; and said water supply conduit means and said second end thereof being configured to facilitate the flow of water therethrough at a flow rate which will allow the water to flow generally outwardly from said second end without creating a spray to allow the pet to drink the water without being frightened thereby.

2. The pet watering device as set forth in claim 1, wherein the source of water includes a faucet and said pet watering device is for being used with a hose, said water supply conduit means includes a major portion independent of said valve means, said major portion includes said second end and an input hose connection opposite of said second end, said valve means includes said first end and an output hose connection opposite said first end, said first end is connected to the faucet, and said output hose connection and said input hose connection are capable of being joined by the hose to allow said second end to be located remote from the faucet.

3. The pet watering device as set forth in claim 2, wherein said pet watering device is for being installed on a lawn, said major portion of said water supply conduit means includes said mounting means for mounting on the ground and for directing the water from said second end in a general outward direction from said major portion at a convenient height above the ground for allowing the pet access thereto.

4. The pet watering device as set forth in claim 3, wherein said sensing means is mounted on said major portion of said water supply conduit means to sense the presence of the pet near said major portion.

5. The pet watering device as set forth in claim 4, further including a pet transmitter capable of being mounted on the pet for transmitting an electronic signal capable of being sensed by said sensing means to indicate said presence of the pet near said major portion when said pet transmitter is mounted on the pet, wherein said sensing means includes a signal transmitter, said valve means includes a signal receiver, and said sensing means is operably connected to said valve means by the transmission of a presence signal from said signal transmitter to said signal receiver after said pet transmitter when mounted on the pet is sensed near said major portion.

6. The pet watering device as set forth in claim 5, wherein at least one of said pet transmitter and said sensing means includes adjustment means for only sensing said presence of said pet transmitter when mounted on the pet within a predetermined range of said major portion.

7. The pet watering device as set forth in claim 6, wherein said sensing means includes a sensor power source, said valve means includes a valve power source independent of said sensor power source, said valve power source provides operating power to activate said valve means, and said operating power is only utilized to cause said valve means to open and to cause said valve means to close.

8. The pet watering device as set forth in claim 7, wherein said valve means includes valve control circuit means including selective timing adjustment means.

9. The pet watering device as set forth in claim 8, wherein said selective timing adjustment means includes opening adjustment for selective said utilization of said operating power to cause said valve means to open after a first predetermined time of continuous sensing of said electronic signal by said sensing means.

10. The pet watering device as set forth in claim 8, wherein said selective timing adjustment means includes closing adjustment for selective said utilization of said operating power to cause said valve means to close during a continuous sensing of said electronic signal by said sensing means after a second predetermined period of time after said utilization of said operating power to cause said valve means to open.

11. The pet watering device as set forth in claim 1, further including automatic means for at least periodically causing a limited flow of the water through said water supply conduit means independent of said presence of the pet near said second end, whereby the utilization of said automatic means for at least periodically causing said limited flow of the water would tend to prevent any freezing of the water in the device at low operating temperatures.

12. The pet watering device as set forth in claim 1, wherein the source of water includes a faucet and a hose which is capable of being connected from the faucet to said first end of said water supply conduit means and said second end is located at said selected position remote from the faucet.

13. The pet watering device as set forth in claim 12, wherein said water supply conduit means includes said mounting means for mounting in a fixed location relative to the ground and for directing the water from said second end in a general outward direction from said water supply conduit means at a convenient height above the ground for allowing the pet access thereto.

14. The pet watering device as set forth in claim 13, further including a pet transmitter capable of being mounted on the pet for transmitting an electronic signal capable of being sensed by said sensing means to indicate said presence of the pet near said second end when said pet transmitter is mounted on the pet, wherein said valve means is located between said first end and said second end and said sensing means is mounted on said water supply conduit means near said second end thereof to sense said presence of said pet transmitter when mounted on the pet and the pet is located near said second end of said water supply conduit means.

15. The pet watering device as set forth in claim 14, wherein at least one of said pet transmitter and said sensing means includes adjustment means for only sensing said presence of said pet transmitter when mounted on the pet within a predetermined range of said second end.

16. The pet watering device as set forth in claim 1, wherein said valve means includes a valve power source for providing operating power to activate said valve means and said operating power is only utilized to cause said valve means to open and to cause said valve means to close.

17. The pet watering device as set forth in claim 16, wherein said valve means includes valve control circuit means including selective timing adjustment means.

18. The pet watering device as set forth in claim 17, wherein said selective timing adjustment means includes opening adjustment for selective said utilization of said operating power to cause said valve means to open after a first predetermined time of continuous sensing of said presence of said pet transmitter when mounted on the pet near said second end.

19. The pet watering device as set forth in claim 17, wherein said selective timing adjustment means includes closing adjustment for selective said utilization of said operating power to cause said valve means to close during a continuous sensing of said presence of said pet transmitter when mounted on the pet near said second end after a second predetermined period of time after said utilization of said operating power to cause said valve means to open.

20. A pet watering device for automatically providing water to a pet, such as a dog, from a source of water under pressure, said pet watering device comprising:

water supply conduit means having a first end for being operably connected to the source of water and a second end for allowing a discharge of the water therefrom;

valve means in said water supply conduit means for being opened to allow the water to flow though said water supply conduit means and closed to prevent the flow of the water therethrough;

said water supply conduit means including mounting means for mounting said second end at a selected position for allowing the pet to drink the water therefrom;

a pet transmitter capable of being mounted on the pet for transmitting an electronic signal;

sensing means for sensing said electronic signal to indicate the presence of said pet transmitter when mounted on the pet near said second end;

said sensing means being operably connected to said valve means to be capable of causing said valve means to be opened after said pet transmitter is sensed near said second end and to be closed after said pet transmitter is no longer sensed near said second end;

said valve means including a valve power source for providing operating power to activate said valve means;

said operating power only being utilized to cause said valve means to open and to cause said valve means to close; and said water supply conduit means and said second end thereof being configured to facilitate the flow of water therethrough at a flow rate which will allow the water to flow generally outwardly from said second end without creating a spray to allow the pet with said pet transmitter thereon to drink the water without being frightened thereby.

21. The pet watering device as set forth in claim 20, wherein said valve means includes valve control circuit means including selective timing adjustment means, said selective timing adjustment means includes first adjustment for selective said utilization of said operating power to cause said valve means to open after a first predetermined time of continuous sensing of said electronic signal by said sensing means, and said selective timing adjustment means includes second adjustment for selective said utilization of said operating power to cause said valve means to close during a continuous sensing of said electronic signal by said sensing means after a second predetermined period of time after said utilization of said operating power to cause said valve means to open.

22. A method of automatically providing water to a pet, such as a dog, from a source of water under pressure, said method comprising the steps of:

providing water supply conduit means having a first end for receipt of the water from the source of water and a second end for allowing discharge of the water therefrom;

providing valve means in said water supply conduit means between said first end and said second end for being selectively opened to allow the water to flow though said water supply conduit means and closed to prevent the flow of the water therethrough;

mounting said second end at a fixed location and in a position for allowing the pet to drink the water therefrom;

sensing the presence of the pet near said second end of said water supply conduit means;

opening said valve means after said sensing of said presence of the pet near said second end;

closing said valve means after there is no longer any said sensing of said presence of the pet near said second end; and causing the flow of the water through said second end to be at a controlled flow rate which will allow the pet to drink the water without being frightened thereby after said opening of said valve means.

23. The method as set forth in claim 22, further including the step of at least periodically causing a limited flow of the water through said water supply conduit means independent of said sensing of said presence of the pet near said second end, whereby said limited flow tends to prevent any freezing of the water in said water supply conduit means at low operating temperatures.

24. The method as set forth in claim 22, wherein said step of mounting said second end includes locating said second end above the ground and said step of causing the flow of water includes directing the water from said second end in a general outward direction from said water supply conduit means at a convenient height above the ground for allowing the pet access thereto.

25. The method as set forth in claim 24, wherein said step of sensing is provided by mounting a transmitter on the pet for transmitting an electronic signal and mounting a sensor on said water supply conduit means adjacent said second end thereof which is capable of sensing said electronic signal for indicating said presence of the pet with said transmitter thereon near said second end of said water supply conduit means.

26. The method as set forth in claim 25, wherein the source of water includes a faucet, said step of providing the water supply conduit means includes providing a major portion physically separated from said valve means with said second end on said major portion and said first end on said valve means and further including the steps of securing said first end to the faucet and installing a hose between said valve means and said major portion of said water supply conduit means.

27. The method as set forth in claim 26, wherein said step of sensing includes transmitting a presence signal from said sensor adjacent said second end and receiving said presence signal at said valve means for said opening and said closing of said valve means.

28. The method as set forth in claim 22, wherein the source of water includes a faucet and a hose and said step of providing said water supply conduit means includes connecting the hose between the faucet and said first end.

29. The method as set forth in claim 22, wherein said step of sensing only occurs when the pet is located within a range of about five feet from said second end.

30. The method as set forth in claim 22, further including the steps of providing operating power to activate said valve means and only utilizing said operating power for said opening of said valve means and for said closing of said valve means.

31. The method as set forth in claim 30, further including the step of selectively delaying said opening of said valve means for a opening predetermined time after said sensing of said presence of the pet.

32. The method as set forth in claim 30, further including the step of selectively initiating said closing of said valve means after a closing predetermined time after said opening of said valve means during said sensing of said presence of the pet.

* * * * *